United States Patent [19]

Culleiton et al.

[11] Patent Number: 4,541,907
[45] Date of Patent: Sep. 17, 1985

[54] PROCESS FOR DECOMPOSING CHLORINATED HYDROCARBON COMPOUNDS

[75] Inventors: Charles J. Culleiton, Tarentum; Alfred F. LaCamera, Level Green; Thomas J. Robare, New Kensington, all of Pa.

[73] Assignee: Aluminum Company of America, Pittsburgh, Pa.

[21] Appl. No.: 601,064

[22] Filed: Apr. 16, 1984

[51] Int. Cl.[4] ............................ C01F 7/60; C25C 3/06
[52] U.S. Cl. ............................................ 204/67; 55/69; 55/71; 423/135; 423/136; 423/137; 423/496
[58] Field of Search ............... 423/130, 136, 135, 137, 423/496, 210.5, DIG. 12; 55/69, 71; 204/60, 67; 62/11

[56] References Cited

U.S. PATENT DOCUMENTS

| | | |
|---|---|---|
| 1,508,451 | 9/1924 | Gray et al. ........................... 423/136 |
| 2,910,140 | 10/1959 | Bencker et al. ........................ 55/71 |
| 4,039,647 | 8/1977 | Wohleber et al. .......... 423/DIG. 12 |
| 4,105,752 | 8/1978 | Becker et al. ......................... 423/496 |
| 4,435,379 | 3/1984 | Olson et al. ......................... 423/496 |

FOREIGN PATENT DOCUMENTS

| | | |
|---|---|---|
| 2817686 | 11/1976 | Fed. Rep. of Germany ........ 204/60 |
| 47-40960 | 10/1972 | Japan . |
| 46673 | 11/1972 | Japan . |

Primary Examiner—John Doll
Assistant Examiner—Jeffrey E. Russel
Attorney, Agent, or Firm—Glenn E. Klepac

[57] ABSTRACT

A process for decomposing chlorinated hydrocarbon compounds wherein the compounds are heated to an elevated temperature of about 800° to 1200° C. and reacted with alumina and a reactive carbon source. A preferred operating temperature is about 800° to 900° C. and preferred carbon sources are activated carbon and coked alumina. The process is particularly useful for disposing of chlorinated organic compounds that are generated in the production of metal chlorides by chlorination of a metal oxide in the presence of carbon.

11 Claims, 3 Drawing Figures

PROCESS FOR DECOMPOSING CHLORINATED HYDROCARBON COMPOUNDS

BACKGROUND OF THE INVENTION

This invention relates to a process for disposing of chlorinated organic compounds, and more particularly to the conversion or decomposition of such compounds generated while producing a metallic chloride by chlorinating a metallic oxide in the presence of a carbon reductant.

Metallic chlorides are used for a variety of purposes including production of metal from metallic chloride salts, such as the production of aluminum from aluminum chloride, for example.

By a well-known process, metallic chlorides are commercially synthesized by chlorinating a metallic oxide in the presence of a carbonaceous reducing agent. Production of metallic chlorides by such a process, however, generates chlorinated organic pollutants, such as hexachlorobenzene. In many uses of metallic chlorides the chlorinated organic by-products must be separated from the chlorides. After separation, the chlorinated organic materials present a difficult disposal problem because they are not readily incinerated and landfill disposal is expensive. Processes for decomposing or converting chlorinated organic materials into compounds which may be safely disposed of or futher used are, therefore, desirable.

Processes are known for the destruction of chlorinated organics. For example, Japanese Pat. No. 7,246,673 describes a process whereby $AlCl_3$ vapors containing hexachlorobenzene as an impurity are brought into contact with a suitable metal in a solid or molten state maintained at a high temperature. Upon contact with the hot metal, the hexachlorobenzene decomposes into carbon and chlorine. The carbon is deposited in or on the metal and the chlorine is given off as a gas. Over time, the buildup or concentration of carbon slows the activity of the metal, and it is reactivated by exposing the heated metal to air which removes the carbon by oxidation.

Another process for removing hexachlorobenzene is described in Japanese Pat. No. 7,240,960. In this process, $AlCl_3$ gas containing hexachlorobenzene is brought into contact with a bed of alumina heated to a temperature of 500° C. to 1200° C. According to the patentees, the alumina reacts with hexachlorobenzene to produce $AlCl_3$, carbon and carbon monoxide, and thus breaks down the objectionable chlorinated hydrocarbon.

In a process for making $AlCl_3$ described in Russell et al U.S. Pat. No. 3,842,163, an alumina having a low alpha phase content is chlorinated in the presence of carbon to produce $AlCl_3$. Low alpha phase content alumina is the desired feedstock because alpha phase alumina has a lesser surface area per particle than other phases such as gamma, for example, and it is therefore less reactive. Because the more reactive alumina material used in the process described by Russell et al preferentially reacts with the available chlorine, the alpha alumina remains unreacted and accumulates in the reactor with continued use. Accumulated alpha alumina, referred to as spent bed material, must be removed from the reactor from time to time to avoid adversely affecting efficient operation of the reactor, and disposal thereof has been a problem.

BRIEF SUMMARY OF THE INVENTION

In the present invention, waste material generated during production of a metallic chloride by chlorinating a metallic oxide in the presence of carbon is conveniently converted or decomposed into useful or disposable products. The waste material is composed substantially of chlorinated organic materials but may include other recoverable materials as well. In the practice of this invention, vaporized chlorinated organic materials are fed to a heated reactor having a metallic oxide source and a reactive carbon source therein.

The chlorinated organic materials principally comprise hexachlorbenzene, $C_6Cl_6$, but may also include minor proportions of other chlorinated hydrocarbon compounds. The chlorinated hydrocarbons are heated to an elevated temperature of about 800° to 1200° C., preferably about 800° to 1100° C. and more preferably about 800° to 900° C., then reacted with alumina and a reactive carbon source. Products of the reaction include aluminum chloride.

In one aspect of the invention, the metallic oxide source and carbon source are waste spent bed material from a reactor in which alumina reacts with chlorine at an elevated temperature in the presence of carbon, forming aluminum chloride. In another aspect of the invention, the waste material containing chlorinated organic material also includes recoverable quantities of salts and the waste material is charged into a heated furnace to separate the chlorinated organic materials from the salts. The heated furnace contains a molten salt bath comprising $NaAlCl_4$ and $LiAlCl_4$.

It is an objective of this invention to convert chlorinated hydrocarbon waste products into useful or disposable compounds.

It is an advantage of this invention that spent bed materials from a reactor for production of metal chlorides can be used to decompose the chlorinated hydrocarbons.

It is a further advantage of this invention that at least a portion of the spent bed materials can be converted into a metallic chloride.

It is yet another advantage that useful electrolyte materials can be recovered from waste materials collected from operation of an electrolytic cell to produce metal from a metallic chloride.

These and other objectives and advantages will be more apparent with reference to the following description of a preferred method of practicing the invention and the attached drawing.

DESCRIPTION OF A PREFERRED EMBODIMENT

Chlorinated organic materials are generated as undesirable by-products in synthesizing a number of metallic chlorides such as aluminum chloride ($AlCl_3$). For convenience, the present invention is described with reference to decomposing chlorinated organics generated in producing $AlCl_3$. It is to be understood that such description is not intended to limit the scope of this invention to the decomposition of only those chlorinated organics generated in producing AlCl$_3$.

Figure 1:
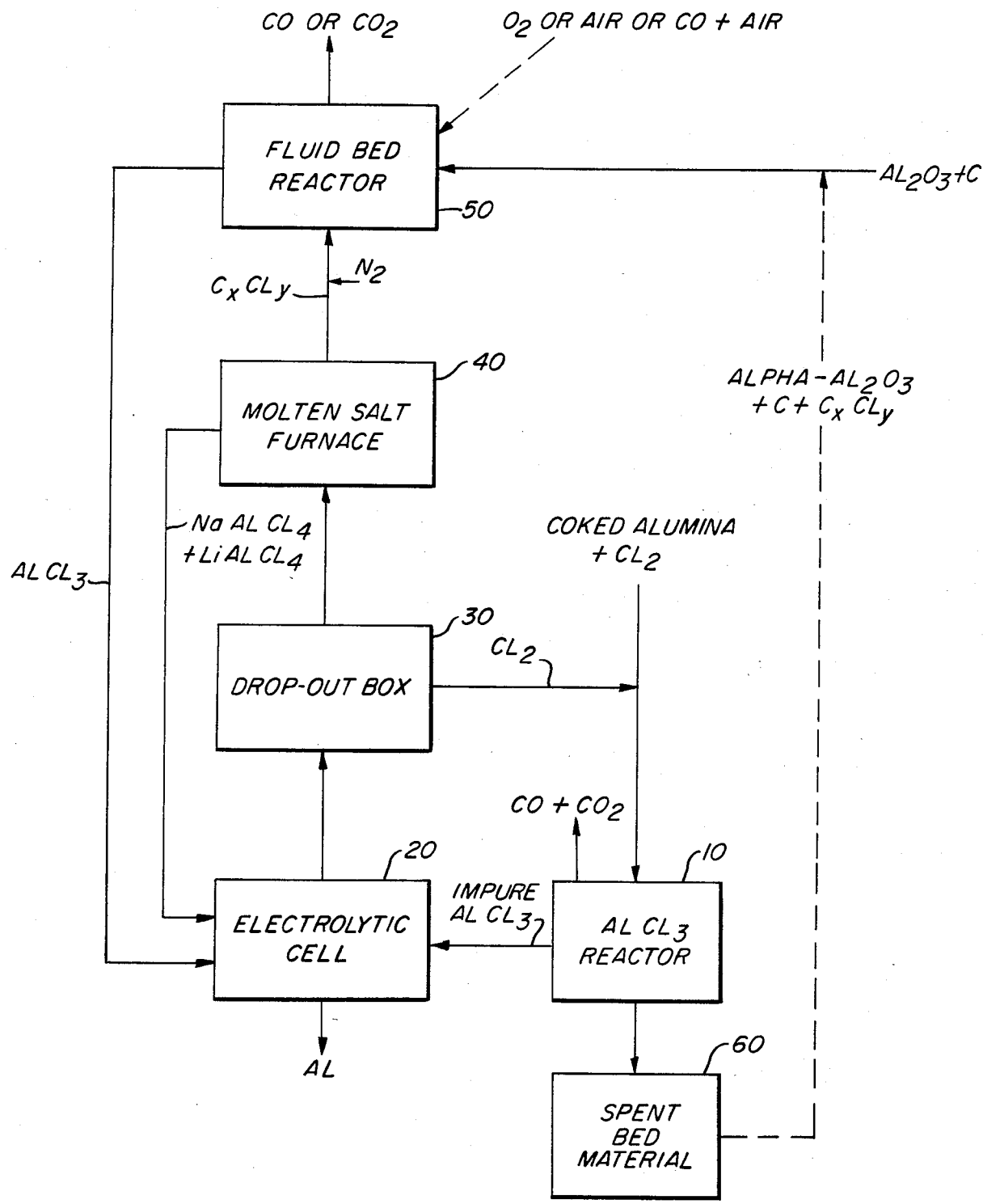
FIG. 1 is a flow sheet diagram of a first embodiment of the process of the invention.

Referring now to FIG. 1, in at least one method of producing AlCl$_3$, a mixture of carbon and alumina having a low alpha content is provided as a bed in a heated AlCl$_3$ reactor 10. In the practice of such a method, it is preferred that the carbon be provided as a coked coating on the alumina particles. Chlorine gas is passed through the coked alumina bed and reacts with it to produce AlCl$_3$. The chlorination reaction is carried out at an elevated temperature of about 500° to 750° C., preferably about 650° to 700° C. Additional details of the chlorination reaction are set forth in Russell et al U.S. Pat. No. 3,842,163, the disclosure of which is incorporated herein by reference to the extent not inconsistent with the present invention.

The AlCl$_3$ is vented from the reactor, and escaping with it are vaporized chlorinated organics generated by portions of the chlorine and carbon which may be expressed by the formula $C_xCl_y$. In many uses of AlCl$_3$, the $C_xCl_y$ material must be removed before the AlCl$_3$ can be utilized. In the case of producing aluminum by electrolysis of AlCl$_3$, however, impure AlCl$_3$ including the chlorinated organic material can be utilized without the necessity of separating chlorinated organics from the AlCl$_3$ feedstock. If impure AlCl$_3$ is used as a feedstock, it is fed into a closed electrolytic cell 20 containing a molten salt electrolyte bath suitable for dissolving AlCl$_3$. Such an electrolyte comprises NaAlCl$_4$ and LiAlCl$_4$, and upon contacting the hot bath, the chlorinated organics are vaporized. Electrolysis of the bath having AlCl$_3$ dissolved therein yields aluminum which collects in the bottom of the cell and chlorine which is given off as a gas. The chlorine, therefore, becomes mixed and contaminated with the chlorinated organic vapors. It may be seen that the chlorine can be recycled for use in the AlCl$_3$ reactor, but unless th chlorinated organic compounds are removed, such compounds would continue to accumulate and adversely affect efficiency of the system.

Therefore, substantially all of the materials escaping the reactor in the vapor are separated from the chlorine exiting from the cell and are solidified and collected in a device 30 which is conveniently called a drop-out box. This box 30 is maintained at a temperature of about 30° C. The drop-out box materials include AlCl$_3$, electrolyte or salts from the bath and $C_xCl_y$, and these materials are fed into a molten salt furnace 40 containing a molten NaAlCl$_4$ bath. The chlorinated organics and AlCl$_3$ are once again vaporized, traces of NaAlCl$_4$ and LiAlCl$_4$ electrolyte are dissolved in the NaAlCl$_4$ bath and any excess bath accumulation is recycled to the electrolytic cell.

From the molten salt furnace 40, the vaporized chlorinated organics and AlCl$_3$ are transported by a nitrogen purge through a bed of alumina and reactive carbon maintained in a fluid bed reactor 50 at a temperature of about 800° to 900° C., preferably about 850° C. The reactive carbon may be in the form of a coked coating on alumina or a mixture of reactive carbon, such as activated carbon, with the alumina. Oxygen or air, or a mixture of air and carbon monoxide, may also be introduced into the reactor to combine with the carbon and to provide a heat source for maintaining the reactor at a proper operating temperature. Upon contacting the alumina bed, the chlorinated organic material is decomposed to chlorine and carbon, the carbon providing an additional fuel source and the chlorine combining with the alumina to form AlCl$_3$ which is then transported to the electrolytic cell 20.

Introduction of reactive carbon into the alumina bed surprisingly improves the efficiency of decomposing the chlorinated organic compounds. Comparative testing showed that 90 to 95% of the chlorinated organic compounds were decomposed with only alumina as the bed material in the reactor 50. When coked alumina was used as the bed material, however, 98 to 100% of the chlorinated organic compounds were decomposed.

Figure 2:
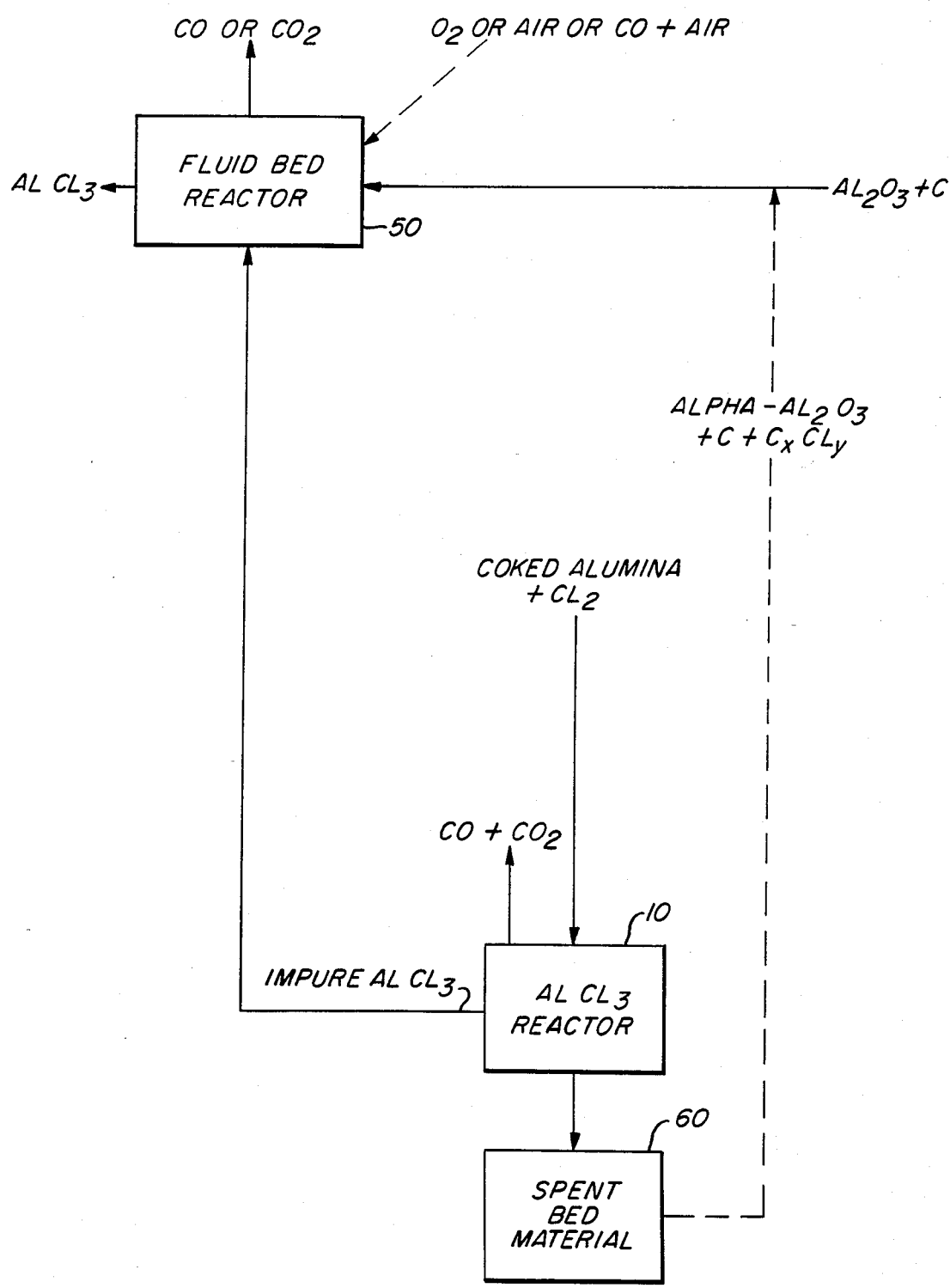
FIG. 2 is a flow sheet diagram of a second embodiment of the process.

The process shown in FIG. 2 is similar to the one shown in FIG. 1, the principal variation being that chlorinated organic materials are obtained directly from the AlCl$_3$ reactor 10. In FIGS. 1 and 2, like-numbered items are identical. In FIG. 2, vapors from the reactor 10 comprising AlCl$_3$ and chlorinated organics are transported directly to the fluid bed reactor 50 where the chlorinated organic materials are decomposed as described above.

If AlCl$_3$ is to be used to produce aluminum, the process of FIG. 1 is preferred because materials in the drop-out box 30 contain a much higher percentage of chlorinated organics than does AlCl$_3$ obtained directly from the reactor 10. Feedstock with a higher concentration of chlorinated organics provides for greater economics in operation of the fluid bed reactor 50. The process of FIG. 2 is preferred when the AlCl$_3$ is to be sold or used in a process where contamination with chlorinated organic compounds might be detrimental.

As has been noted heretofore, the alumina used in the AlCl$_3$ reactor 10 is one having a low alpha alumina content, and the accumulated alpha alumina must be removed from time to time to maintain operating efficiency. For the highest operating efficiency of the reactor, it is preferred that carbon required for reducing the alumina be provided by coating the alumina particles with coke. Thus, a substantial proportion of the unreacted alpha alumina that accumulates in the reactor is coked and this product is referred to as spent bed material 60. This material typically comprises about 5 to 20 wt.% carbon and about 25 to 75 wt.% alpha alumina.

By testing, it has been determined that if spent bed material is used for the alumina bed in the chlorinated organic reactor, 98 to 100% of the chlorinated organic material is decomposed to produce AlCl$_3$ and CO and CO$_2$ as off-gases. It may be seen, therefore, that use of spent bed material 60 is as effective as using new alumina in the practice of this invention, and such use not only solves the problem of disposing of spent bed material, but also provides for generation of valuable purified AlCl$_3$ as well.

To measure the effectiveness of this invention, mass balance tests were performed using a variety of feedstocks and operating conditions. A description of the tests performed and results therefrom follows.

EXAMPLES

Figure 3:
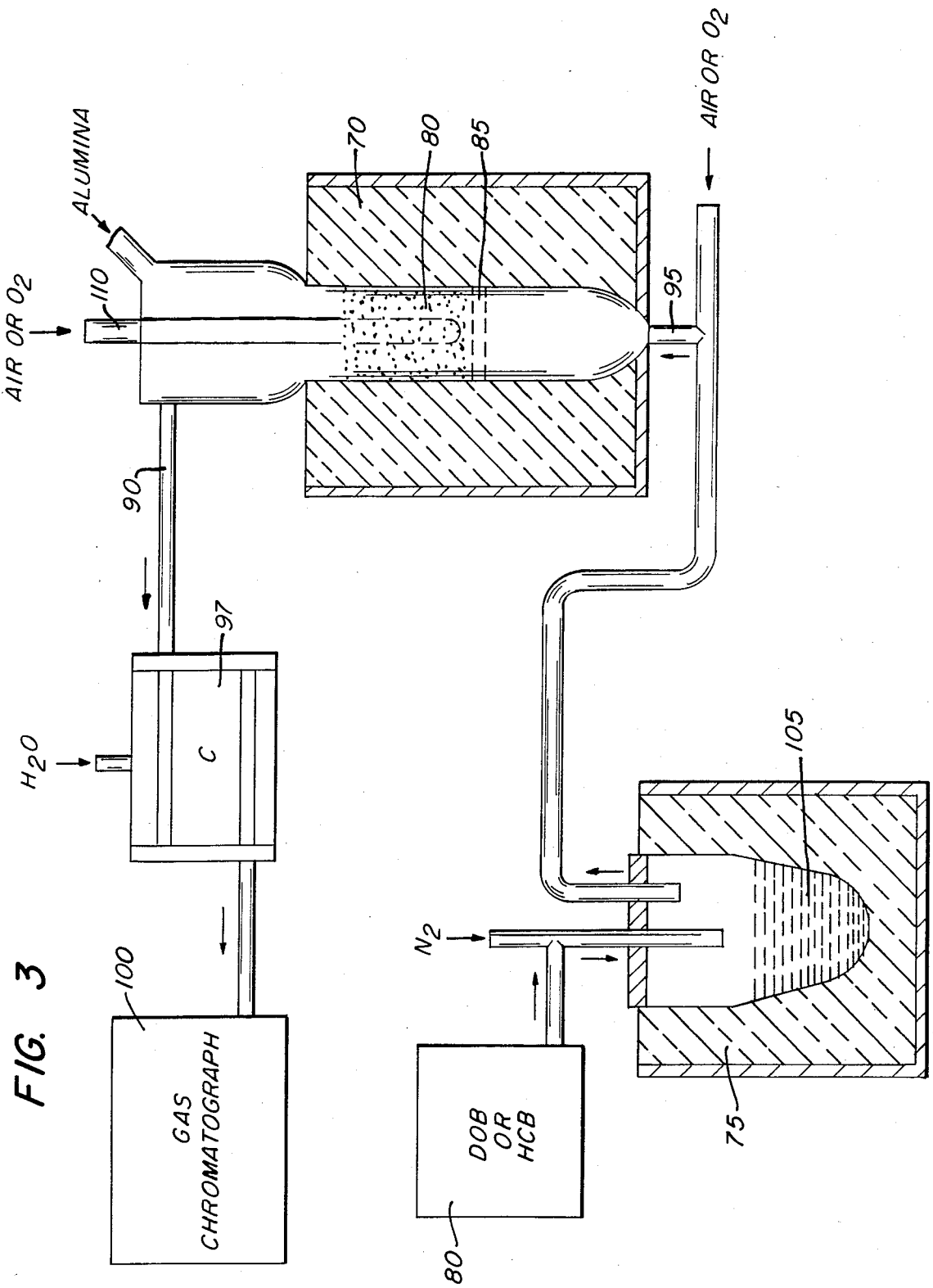
FIG. 3 is a schematic illustration of a laboratory system for testing the process of the invention.

A total of 22 tests were made using various feedstocks and bed materials in the laboratory system illustrated schematically in FIG. 3. Data and results of these tests are shown in Table 1. All of the tests were made using a bench scale quartz fluid bed reactor 70 maintained at 850° C., except tests 18 and 19 which were conducted at 900° C. The molten salt furnace 75 used in all of the tests was a quartz furnace maintained at 400° C. The molten salt furnace 75 received a feed of chlorinated organic material 80 carried in a nitrogen stream at 4.0 standard cubic feet per hour (SCFH) and the furnace 75 was further adapted to discharge vapors of the chlorinated organic material in such nitrogen stream.

The fluid bed reactor 70 included a bed of alumina 80 upon a quartz frit 85, an outlet 90 at the top to discharge vaporized $AlCl_3$, and an inlet 95 in the bottom to receive chlorinated organic vapor carried in the nitrogen stream.

The apparatus for the tests further included a condenser 97 to condense materials discharged from the reactor 70 and then sent to a gas chromatograph 100 in order to determine mass balance and also to analyze the condensate for unreacted chlorinated organic material.

Chlorinated organic feed materials used in the tests included practical grade hexachlorobenzene (HCB) or drop-out box material (DOB) which had a typical analysis of 54.7 wt.% $AlCl_3$, 17.2 wt.% $NaAlCl_4$, 15.3 wt.% $C_xCl_y$, 5.2 wt.% $LiAlCl_4$, 0.4 wt.% $TiCl_4$, 0.3 wt.% sulfur, and 0.1 wt.% $FeCl_3$.

Alumina bed materials were either partially calcined alumina (PCA), which was mostly gamma phase alumina, or spent reactor bed material comprising coked alpha alumina particles. In some of the tests using PCA as a bed material, various quantities and forms of carbon were also added to determine the relative effectiveness of the carbon additives.

TABLE 1

| Test | Reactor Material Amount & Type | Feed Material Amount & Type | Feed Composition $C_xCl_y$ (grams) | $NaAlCl_4$ + $LiAlCl_4$ (grams) | Conversion of $C_xCl_y$ (%) |
|---|---|---|---|---|---|
| 1 | 590 g (a) | 168.0 g DOB | 25.70 | 31.6 | 98.5 |
| 2 | 590 g (a) | 207.0 g DOB | 31.67 | 39.0 | 94.6 |
| 3 | 590 g (a) | 118.0 g DOB | 18.05 | 22.2 | 91.2 |
| 4 | 590 g (a) | 158.0 g DOB | 24.17 | 29.8 | 89.2 |
| 5 | 590 g (a) | 118.0 g HCB | 116.4 | 0 | 91.3 |
| 6* | 590 g (a) | 135.2 g HCB | 132.5 | 0 | 77.7 |
| 7 | 590 g (a) | 188.6 g HCB | 184.8 | 0 | 94.6 |
| 8* | 738 g (b) | 185.9 g HCB | 182.2 | 0 | 81.5 |
| 9* | 738 g (b) | 201.0 g DOB | 30.75 | 37.9 | 86.1 |
| 10* | 738 g (b) | 252.0 g DOB | 38.56 | 47.4 | 87.8 |
| 11 | 590 g (a) | 163.7 g HCB | 160.4 | 0 | 95.4 |
| 12 | 590 g (a) | 169.3 g HCB | 165.9 | 0 | 94.4 |
| 13* | 738 g (b) | 193.8 g HCB | 189.9 | 0 | 70.5 |
| 14* | 1476 g (c) | 195.3 g HCB | 191.4 | 0 | 83.0 |
| 15* | 738 g (b) | 175.0 g DOB | 26.78 | 32.98 | 81.4 |
| 16* | 590 g (d) | 217.7 g HCB | 213.4 | 0 | 96.5 |
| 17* | 738 g (e) | 210.8 g HCB | 206.6 | 0 | 99.9 |
| 18* | 738 g (f) | 115.3 g HCB | 113.0 | 0 | 87.8 |
| 19* | 738 g (g) | 180.2 g HCB | 176.6 | 0 | 99.9 |
| 20* | 590 g (h) | 199.5 g HCB | 195.5 | 0 | 97.6 |
| 21* | 590 g (d) | 230.0 g DOB | 35.19 | 43.28 | 99.8 |
| 22* | 738 g (e) | 339.0 g DOB | 63.83 | 57.56 | 95.4 |

*Oxygen added to fluidization gas
(a) = 590 g partially calcined alumina
(b) = 590 g partially calcined alumina + 148 g petroleum coke
(c) = 1180 g partially calcined alumina + 296 g petroleum coke
(d) = 590 g coked alumina (17.6 wt. % C)
(e) = 590 g partially calcined alumina + 148 g activated carbon
(f) = 590 g partially calcined alumina + 148 g petroleum coke-900° C.
(g) = 590 g spent reactor bed (7.5 wt. % C)-900° C.
(h) = 590 g spent reactor bed (7.5 wt. % C)-850° C.
DOB = drop-out box material (15.3 wt. % $C_xCl_y$)
HCB = hexachlorobenzene In tests 2, 3 and 4, the molten salt furnace 75 contained 800 g of molten $NaAlCl_4$ to simulate the process of this invention as it might be practiced in a plant producing aluminum from $AlCl_3$. In these tests, however, a substantial amount of $AlCl_3$ vaporized from the molten salts 105 during heat-up and while feeding the chlorinated organic materials which made it difficult to determine a good mass balance. In all of the subsequent tests, therefore, molten $NaAlCl_4$ was not used in the molten salt furnace 75. Eliminating the molten salt 105 did not adversely affect ultimate decomposition of the chlorinated organic materials because the temperature of the reactor was sufficient to vaporize such materials for transport to the fluid bed reactor 70. In the tests using DOB feedstock, the $NaAlCl_4$ and $LiAlCl_4$ components were retained in the molten salt furnace 75 while the chlorinated organics were swept with nitrogen through the reactor 70. Analysis of the results shown in Table 1 demonstrates the marked improvement in efficiency of decomposing the chlorinated organic material by adding reactive carbon to the alumina bed in the fluid bed reactor 70.

When using fresh partially calcined alumina with no carbon present in the fluid bed 80, the conversion of $C_xCl_y$ was approximately 90 to 95%. With addition of a reactive carbon in the form of a coked coating on fresh alumina or on the alpha alumina in the spent bed material or in the form of an activated carbon mixed with fresh alumina, the conversion improved to between 95.4% (Test 22) and 99.9% (Test 19).

It may also be noted that tests were made using petroleum coke, a less reactive carbon, in the alumina bed 80, and the conversion of $C_xCl_y$ dropped to 70 to 80%. Although not fully understood, the drop in conversion efficiency when using petroleum coke may be attributable to one or more of the following factors:

1. oxygen preferentially reacting with the carbon that deposits on the surface of the alumina from the destruction of the $C_xCl_y$, or
2. increasing amounts of CO and $CO_2$ in the off-gas, or
3. a change in the reaction mechanism, as shown by the presence of $Cl_2$ and $COCl_2$ in the off-gas.

It was also noted during the tests that the point of introduction of oxygen into the reactor 70 when using drop-out box material as feedstock may affect operation of the reactor. In tests 9, 10 and 15, the drop-out box material was fed with 0.68 SCFH $O_2$ and 4.0 SCFH $N_2$ into the reactor 70. The vapors of $C_xCl_y$ and $AlCl_3$ were then swept through the bed of petroleum coke plus alumina in the reactor 70. It was observed that the $AlCl_3$ vapors reacted with oxygen in the 850° C. heated zone at the base of the reactor 70 and on the bottom of the quartz frit to form $Al_2O_3$, and the buildup on the frit eventually plugged the reactor 70. In tests 21 and 22, oxygen was added through a tube 110 in the top of the reactor extending to a point just above the frit 85, and no plugging was encountered.

The foregoing description has been made with reference to two preferred embodiments of our invention. Persons skilled in the art will understand that our process can be changed or modified in several ways without departing from the spirit and scope of the following claims.

What is claimed is:

1. A process for production of aluminum wherein chlorine contaminated with chlorinated hydrocarbons is formed as a by-product, said process comprising
   (a) electrolyzing in a molten salt bath and at an elevated temperature aluminum chloride contaminated with chlorinated hydrocarbons, thereby to form
      (1) aluminum, and
      (2) chlorine gas contaminated with a mixture of chlorinated hydrocarbons comprising principally hexachlorobenzene, (b) collecting said mixture together with salts from the bath and separately from the chlorine gas, (c) separating the salts from the mixture by dissolving said salts in a molten $NaAlCl_4$ bath, (d) heating the mixture to an elevated temperature of about 800° to 1200° C., and (e) reacting the mixture with alumina and a reactive carbon source at said elevated temperature, said reactive carbon source being selected from the group consisting of activated carbon, coked alumina and mixtures thereof, thereby to form aluminum chloride and other products.

2. The process of claim 1 wherein said reactive carbon source is coked alumina.

3. The process of claim 1 wherein step (e) is carried out at a temperature of about 800° to 1100° C.

4. The process of claim 1 wherein step (e) is carried out at a temperature of about 800° to 900° C.

5. The process of claim 1 wherein step (e) is carried out at about 850° C.

6. The process of claim 1 wherein step (e) is performed in the presence of oxygen.

7. The process of claim 1 further comprising (f) recovering spent bed material from a reactor in which chlorine is reacted with a fluidized bed comprising alumina and carbon at an elevated temperature to form aluminum chloride, said spent bed material comprising alpha alumina and carbon, and (g) reacting said spent bed material with the heated mixture in step (e).

8. The process of claim 1 wherein step (c) is carried out in a furnace.

9. The process of claim 1 wherein step (e) is carried out without addition of chlorine gas.

10. The process of claim 4 wherein about 95.4 to 99.9 wt.% of the mixture is decomposed in step (e).

11. The process of claim 1 wherein step (e) is performed in a fluidized bed.

* * * * *